United States Patent [19]

Fukushima et al.

[11] Patent Number: 4,618,092
[45] Date of Patent: Oct. 21, 1986

[54] REFRIGERANT FLOW RATE CONTROL DEVICE

[75] Inventors: Toshihiko Fukushima, Ibaraki; Seigo Miyamoto, Takahagi; Masahiko Fujita, Ibaraki; Masanori Musoo; Kosaku Sayo, both of Katsuta, all of Japan

[73] Assignee: Hitachi, Ltd., Tokyo, Japan

[21] Appl. No.: 676,320

[22] Filed: Nov. 29, 1984

[30] Foreign Application Priority Data

Nov. 30, 1983 [JP] Japan ................................. 58-224148

[51] Int. Cl.⁴ ........................................... G05D 27/00
[52] U.S. Cl. .................................. 236/92 B; 62/528; 251/282; 251/335.3
[58] Field of Search ........................ 62/528, 222, 223; 251/335 B, 282; 236/92 B

[56] References Cited

U.S. PATENT DOCUMENTS

| 2,165,518 | 7/1939 | Stolz ................................. 236/92 B |
| 2,165,519 | 7/1939 | Stolz et al. ........................ 236/92 B |
| 3,684,238 | 8/1972 | Michellone et al. ............. 251/282 X |
| 4,129,995 | 12/1978 | Uaumi ................................... 62/217 |

*Primary Examiner*—William E. Wayner
*Attorney, Agent, or Firm*—Antonelli, Terry & Wands

[57] ABSTRACT

A refrigerant flow rate control device for the refrigeration cycle of an air conditioning system of an automotive vehicle which is driven by a vacuum actuator includes a communication passageway for equalizing pressures applied to opposite ends of a valve body. The valve body has an intermediate portion maintained in communication with the atmosphere and connected to the vacuum actuator.

2 Claims, 3 Drawing Figures

REFRIGERANT FLOW RATE CONTROL DEVICE

BACKGROUND OF THE INVENTION (1) Field of the Invention

This invention relates to refrigerant flow rate control devices, and more particularly it is concerned with a refrigerant flow rate control device suitable for use with the refrigeration cycle of an air conditioning system for an automotive vehicle.

(2) Description of the Prior Art

One type of the refrigeration cycle of an air conditioning system for an automotive vehicle is disclosed in U.S. Pat. No. 4,129,995, in which a temperature sensor and a pressure sensor are located at the outlet of an evaporator to enable a refrigerant to evaporate optimally in the evaporator in accordance with an external heat load. The temperature sensor and pressure sensor monitor the temperature and pressure, respectively, of the refrigerant and produce signals, and sensing of superheat is effected based on these signals. Valve opening regulating means is provided to regulate the degree of opening of a refrigerant flow rate control valve in such a manner that the superheat sensing coincides with a predetermined value.

In the valve opening regulating means, various types of actuator may be used to cause the degree of opening of the refrigerant flow rate control valve to change. They may include the internal pressure of a gas-sealed cylindrical temperature sensitive member, a solenoid device and a stepping motor. However, in an air conditioning system for an automotive vehicle, a negative pressure in the suction manifold of an engine may be advantageously used when weight, motive-power that is required and reliability in performance are taken into consideration.

In a refrigerant flow rate control device of the prior art driven by a vacuum serving as an actuator, a sealing member, such as a bellows, which is capable of freely changing its shape is used to provide a cover to a portion of a valve body extending through a valve drum to effectively prevent leaks of the refrigerant to the atmosphere through the interface between sliding surfaces of the valve body and valve drum and enable displacements of the valve body to take place without any trouble. This makes the pressure applied by the refrigerant to the sealed portion covered with the sealing member equal in level to a pressure at the down-stream end portion of an orifice, so that a force is exerted by the difference between this value and the atmospheric pressure to move the valve body to an open position.

Generally, the refrigeration cycle has the risk that when the compressor is inoperative, a liquid refrigerant might flow into the compressor and compression of the liquid refrigerant occurs as the compressor is started again, thereby causing damage to the compressor. To avoid this trouble, it is necessary that the refrigerant flow rate control valve be completely shut off when the compressor is rendered inoperative. To this end, it has hitherto been usual practice to use a spring of high resilience as a restoring spring, so that the biasing force of the restoring spring will overcome the force exerted by the pressure of the refrigerant acting on the sealed portion to shut off the valve when the compressor is rendered inoperative. Meanwhile, when the valve is opened, it is necessary to drive the valve body by overcoming the biasing force of the restoring spring. This has given rise to the problem that the size of a diaphragm should be increased sufficiently to increase a drive force exerted by the vacuum actuator.

On the other hand, U.S. Pat. No. 3,684,238 discloses an electromagnetically controlled fluid pressure modulating valve including a valve body formed with a through hole so as to equalize pressures that are applied to opposite ends of the valve body. However, this valve is a solenoid valve and an existing vacuum actuator is unusable as it is with this valve. When the existing vacuum actuator is used, a drive force produced by the vacuum actuator should be mechanically transmitted to the valve to drive the valve body. Thus, the valve body should have a portion extending through a valve drum and exposed to the atmosphere. This makes it necessary to provide seal means to the portion of the valve body extending through the valve drum to prevent leaks of a refrigerant from the refrigeration cycle to the atmosphere while allowing the valve body to move through the valve drum. Thus, it would be impossible to apply the valve shown in U.S. Pat. No. 3,684,238 to a refrigerant flow rate control device.

SUMMARY OF THE INVENTION

This invention has been developed for the purpose of obviating the above-noted disadvantages of the prior art. Accordingly, the invention has as its object the provision of a refrigerant flow rate control device suitable for use with the refrigeration cycle of an air conditioning system for an automotive vehicle capable of using an existing vacuum actuator in combination with a valve of the device and controlling displacements of a valve body without being influenced by a change in the pressure in a portion of the valve down-stream of an orifice taking place as the degree of opening of the valve body undergoes a change, such device being free from the risk that the control device might become unstable as a system in operation and incapable of achieving effects.

The outstanding characteristic of the invention enabling the above-noted object to be accomplished is that the refrigerant flow rate control device comprises a pressure chamber provided with seal means located opposite an orifice with respect to a portion of a valve drum through which a valve body extends, the valve body having one end positioned against the orifice and an opposite end located in the pressure chamber, and a communication passageway for a fluid pressure applied to a sealed space in the portion of the valve drum through which the valve body extends to be led therethrough to the pressure chamber.

DESCRIPTION OF THE PREFERRED EMBODIMENTS

Figure 1:
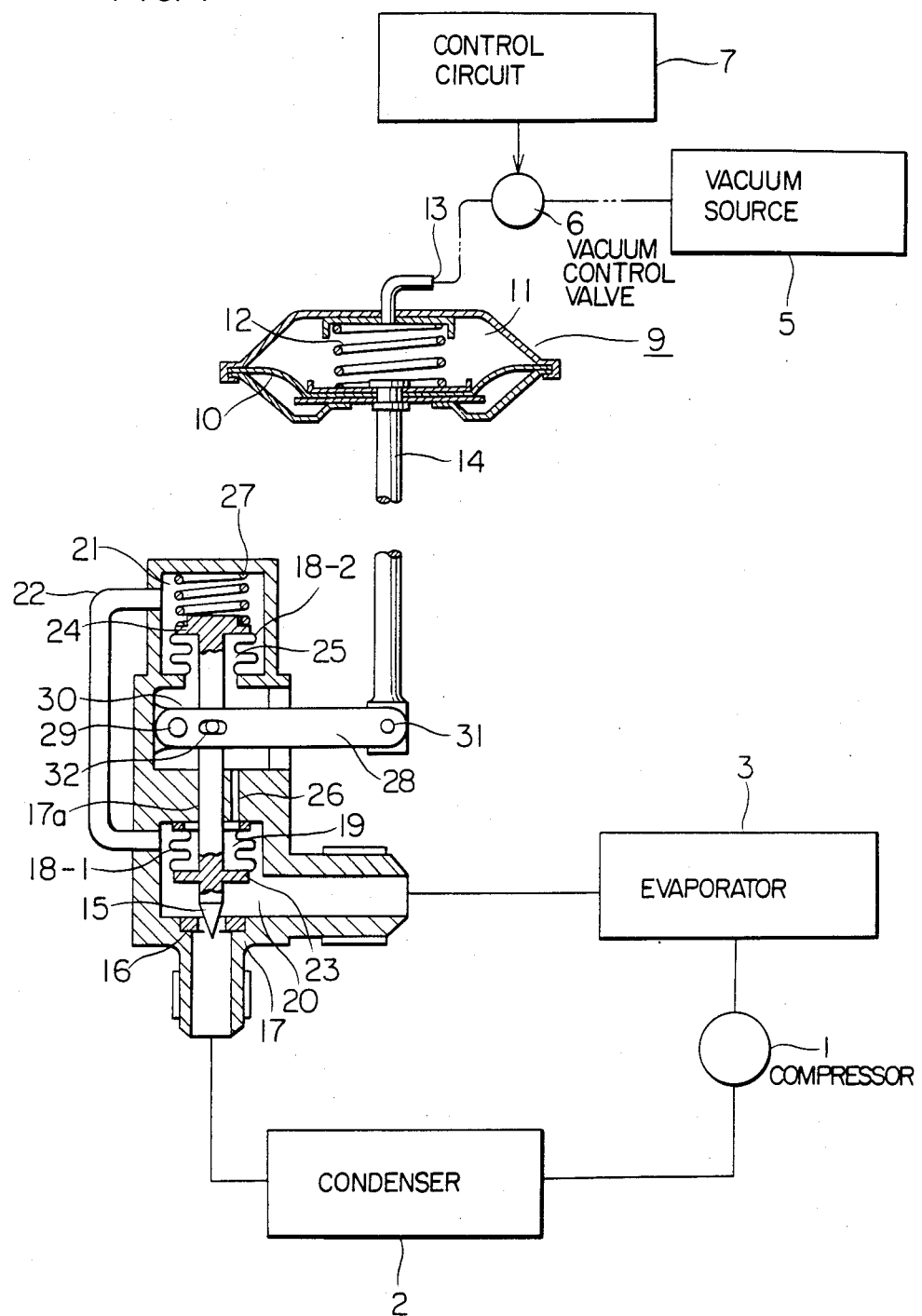
FIG. 1 is a vertical sectional view of the refrigerant flow rate control device comprising one embodiment of the invention.

One embodiment of the invention will be described by referring to FIG. 1.

The refrigeration cycle of an air conditioning system comprises a compressor 1, a condenser 2 and an evaporator 3. A vacuum actuator 9 comprises a diaphragm 10, a vacuum chamber 11, a restoring spring 12, a vacuum communication nipple 13 and a rod 14. The vacuum communication nipple 13 is connected to a vacuum source 5 utilizing a suction manifold vacuum. The numeral 6 designates a vacuum control valve which is controlled by control signals supplied from a control circuit 7 in accordance with the conditions of the refrigeration cycle.

The construction of a valve section of the refrigerant flow rate control device will be described. The valve section includes a valve body 15 connected to the rod 14 of the actuator 9 through a link 28. One end of the valve body 15 is positioned against an orifice 16 through which a refrigerant flows and changes its position relative to the orifice 16 so that a stream of refrigerant flowing through the orifice 16 will have its cross-sectional area varied to thereby change the flow rate of the refrigerant. The valve body 15 and orifice 16 are supported by a valve drum 17 including a valve body penetrating portion 17a.

A seal member 18-1 constituting seal means capable of freely changing its shape is mounted to one end portion 23 of the valve body 15 near the orifice 16 to prevent leaks of the refrigerant through the valve body penetrating portion 17a of the valve drum 17. The numerals 19 and 20 designate a sealed space and an orifice down-stream end portion, respectively.

The numeral 21 designates a pressure chamber located opposite the orifice 16 with respect to the valve body penetrating portion 17a of the value drum 17. A pressure equalizing tube 22 maintains the pressure chamber 21 in communication with the orifice down-stream end portion 20 to serve as a communication passageway for a fluid pressure of the refrigerant acting on the sealed space 19 to be led therethrough to the pressure chamber 21. Thus, the pressure in the pressure chamber 21 and the pressure in the orifice down-stream end portion 20 are rendered equal to each other.

An opposite end of the valve body 15 is positioned in the pressure chamber 21, and a seal member 18-2 constituting seal means which is capable of freely changing its shape is mounted to an opposite end portion 24 of the valve body 15 near the pressure chamber 21 to partition a sealed space 25 on the side of the atmosphere from the pressure chamber 21.

A portion of the valve body 15 sealed by the seal member 18-1 at one end portion 23 thereof near the orifice 16 and a portion thereof sealed by the seal member 18-2 at the opposite end portion 24 thereof near the pressure chamber 21 are equal to each other in the refrigerant pressure receiving surface area. The valve drum 17 is formed with a duct 26 opening in the sealed space 19 at one end portion 23 of the valve body 15 near the orifice 16 to maintain the sealed space 19 in communication with the atmosphere, so that the atmospheric pressure will act in the sealed space 19.

A restoring spring 27 which is mounted in the pressure chamber 21 is seated at the opposite end portion 24 of the valve body 15 near the pressure chamber 21.

The link 28 connecting the valve body 15 to the rod 14 of the actuator 9 is constructed such that it has a supporting point 29 on the valve drum 17, a point of action 30 on the valve body 15 and a point of force 31 on the rod 14 of the actuator 9, with the point of force 31 being located opposite the supporting point 29 with respect to the point of action 30 and the distance between the supporting point 29 and the point of action 30 being smaller than the distance between the point of action 30 and the point of force 31. By this arrangement, the point of action 30 has a smaller displacement than the point of force 31, thereby making it possible to minimize influences exerted by a displacement setting error with regard to the diaphragm 10 on a displacement error of the valve body 15. The point of action 30 is borne by a bearing 32 in the form of a slot, so that a variation in the distance between the supporting point 29 and the point of action 30 caused by the movement of the link 28 can be accommodated.

Operation of the refrigerant flow rate control device constructed as described hereinabove will now be described.

In the present invention, a force exerted by a fluid pressure of the refrigerant on the sealed space 19 at the one end portion 23 of the valve body 15 near the orifice 16 can be made equal in magnitude to a force exerted on the sealed space 25 at the opposite end portion 24 of the valve body 15 near the pressure chamber 21 and cause the two forces to be oriented in opposite directions. Thus, the force exerted on the sealed space 19 can be cancelled out by the force exerted on the sealed space 25, so that the resilience of the restoring spring 27 mounted in the pressure chamber 21 and the resilience of the restoring spring 12 mounted in the actuator 9 can be decreased, making it possible to decrease the size of the diaphragm 10.

Also, even if the pressure in the orifice downstream end portion 20 undergoes a change as the degree of opening of the valve is varied to control the flow rate of the refrigerant, it is possible to control the displacement of the valve body 15 without the vacuum actuator 9 being influenced by the change undergone by the pressure in the orifice down-stream end portion 20, because the force acting on the sealed space 19 can be cancelled out by the force acting on the sealed space 25. This enables instability of the control system to be avoided, thereby making it possible to prevent the control system from becoming incapable of effecting control.

Figure 2:
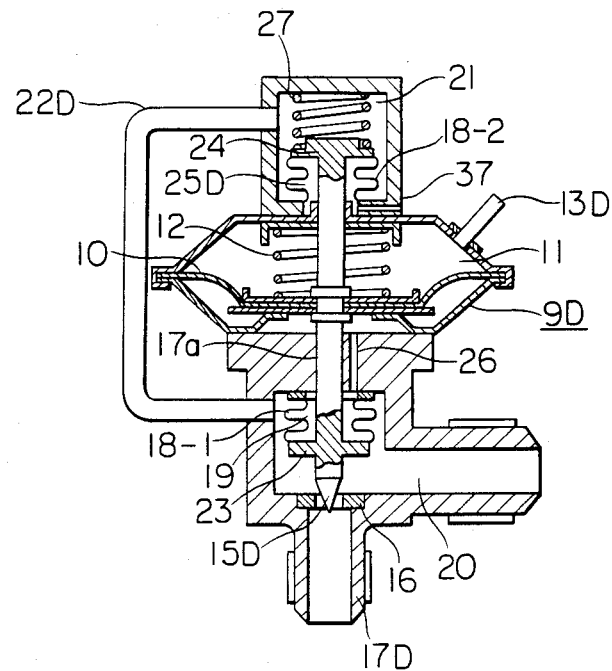
FIG. 2 is a vertical sectional view of the refrigerant flow rate control device comprising another embodiment.

FIG. 2 is a vertical sectional view of another embodiment of the refrigerant flow rate control device in conformity with the invention. In the embodiment shown in FIG. 2, the rod 14 of the actuator 9 shown in FIG. 1 is formed as the same entity as the valve body 15 into a valve body 15D shown in FIG. 2, and a valve drum 17D is interposed between the sealed space 19 near the orifice and the pressure chamber 21 while an actuator 9D is formed as a unit with the valve drum 17D. A duct 37 keeps a sealed space 25D on the side of the atmosphere sealed by the seal member 18-2 in communication with the atmosphere.

A vacuum communication nipple 13D is disposed in a position distinct from the position in which the vacuum communication nipple 13 is located in FIG. 1. A pressure equalizing tube 22D maintains the pressure chamber 21 in communication with the orifice down-stream end portion 20.

The embodiment shown in FIG. 2 enables an overall compact size to be obtained in a refrigerant flow rate control device because the actuator 9D need not be mounted separately from the valve section, and yet capable of achieving the same effects as achieved by the embodiment shown in FIG. 1.

Figure 3:
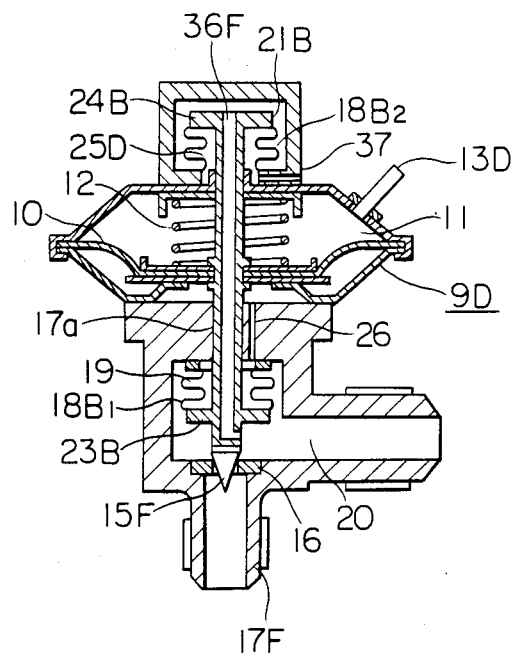
FIG. 3 is a vertical sectional view of the refrigerant flow rate control device comprising still another embodiment.

FIG. 3 shows still another embodiment which is distinct from the embodiment shown in FIG. 2 in that the pressure equalizing tube 22D shown in the latter is replaced by a pressure equalizing bore 36F formed in a valve body 15F for keeping the pressure chamber 21 in communication with the orifice down-stream end portion 20. The embodiment shown in FIG. 3 enables the same effects as achieved by the embodiment shown in FIG. 2 to be achieved, and allows a further reduction in size to be obtained.

The embodiment shown in FIG. 3 has a valve drum 17F which has no pressure equalizing tube mounting portions. This is conducive to a reduction in the number of portions through which leaks of refrigerant might occur and increased reliability of the refrigeration cycle in performance.

What is claimed is:

1. A refrigerant flow rate control device for effecting control of the flow rate of a refrigerant released from a condenser and for introducing said refrigerant to an evaporator while causing same to undergo adiabatic expansion, comprising:

means including an orifice for providing a passage for refrigerant to flow through;

a valve body extending into said passage downstream of said orifice and having one end positioned in proximity to said orifice and operative to change its position relative to the orifice to vary the cross-sectional area of said passage to control the stream of refrigerant flowing through said passage;

a valve drum for supporting said orifice and said valve body and having said passage extending therethrough;

seal means for sealing a portion of the valve drum through which the valve body extends;

a vacuum actuator mounted on said valve drum for controlling displacements of said valve body, said valve body extending through said vacuum actuator and being connected thereto so as to be actuated thereby;

a pressure chamber provided with seal means and located opposite said valve drum from said vacuum actuator and having positioned therein the opposite end of said valve body from the end operatively associated with said orifice; and a communication passageway extending between said pressure chamber and a point in said passage downstream of said orifice for equalizing the fluid pressure applied to the downstream part of said passage through which the valve body extends and the fluid pressure in said pressure chamber.

2. A refrigerant flow rate control device according to claim 1, wherein said communication passageway extends through said valve body.

* * * * *